(12) United States Patent
Lee

(10) Patent No.: US 11,452,968 B2
(45) Date of Patent: Sep. 27, 2022

(54) SYSTEM AND METHOD FOR EXTRACTING CARBON DIOXIDE FROM ATMOSPHERIC AIR VIA PRESSURE-SWING ABSORPTION

(71) Applicant: Aeolus Works LLC, Palo Alto, CA (US)

(72) Inventor: William Andy Lee, Palo Alto, CA (US)

(73) Assignee: Aeolus Works LLC, Palo Alto, CA (US)

( * ) Notice: Subject to any disclaimer, the term of this patent is extended or adjusted under 35 U.S.C. 154(b) by 0 days.

(21) Appl. No.: 17/079,087

(22) Filed: Oct. 23, 2020

(65) Prior Publication Data

US 2021/0121818 A1 Apr. 29, 2021

Related U.S. Application Data

(60) Provisional application No. 62/925,721, filed on Oct. 24, 2019, provisional application No. 62/985,759, filed on Mar. 5, 2020, provisional application No. 63/072,332, filed on Aug. 31, 2020.

(51) Int. Cl.
*B01D 53/14* (2006.01)

(52) U.S. Cl.
CPC .... *B01D 53/1475* (2013.01); *B01D 2257/504* (2013.01)

(58) Field of Classification Search
None
See application file for complete search history.

(56) References Cited

U.S. PATENT DOCUMENTS 11,097,221 B2 * 8/2021 Lu ........................ C01B 32/50
2020/0048165 A1 2/2020 Duggal et al.

FOREIGN PATENT DOCUMENTS

WO 2016005226 A1 1/2016

OTHER PUBLICATIONS

International Search Report and Written Opinion for International Patent Application No. PCT/US2021/056511 dated Feb. 16, 2022; 9 pages.
Rubin, et al., "IPCC Special Report on Carbon Dioxide Capture and Storage", Cambridge University Press 2005, Online 2005, 19 pages.

* cited by examiner

*Primary Examiner* — Daniel Berns
(74) *Attorney, Agent, or Firm* — Run8 Patent Group, LLC; Peter Miller; Leah Raddatz

(57) ABSTRACT

One variation of a method for carbon sequestration includes: mixing ambient air including carbon dioxide and secondary gases with a working fluid to generate a first mixture; conveying the first mixture through a compressor to pressurize the first mixture from a first pressure to a second pressure greater than the first pressure to promote absorption of carbon dioxide into the working fluid; depositing the first mixture in a high-pressure vessel to generate an exhaust stream of secondary gases and a second mixture including carbon dioxide dissolved in the working fluid; conveying the second mixture through a turbine configured to extract energy and reduce pressure of the second mixture, from the second pressure to the first pressure, to promote desorption of carbon dioxide from the working fluid; transferring the second mixture into the low-pressure vessel; and releasing carbon dioxide, desorbed from the working fluid, from the low-pressure vessel for collection.

1 Claim, 5 Drawing Sheets

SYSTEM AND METHOD FOR EXTRACTING CARBON DIOXIDE FROM ATMOSPHERIC AIR VIA PRESSURE-SWING ABSORPTION

CROSS-REFERENCE TO RELATED APPLICATIONS

This application claims the benefit of U.S. Provisional Application No. 62/925,721, filed on 24 Oct. 2019, U.S. Provisional Application No. 62/985,759, filed on 5 Mar. 2020, and U.S. Provisional Application No. 63/072,332, filed on 31 Aug. 2020, each of which is incorporated in its entirety by this reference.

TECHNICAL FIELD

This invention relates generally to the field of carbon sequestration and more specifically to a new and useful system and method for pressure-swing absorption of carbon dioxide in the field of carbon sequestration.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 3:
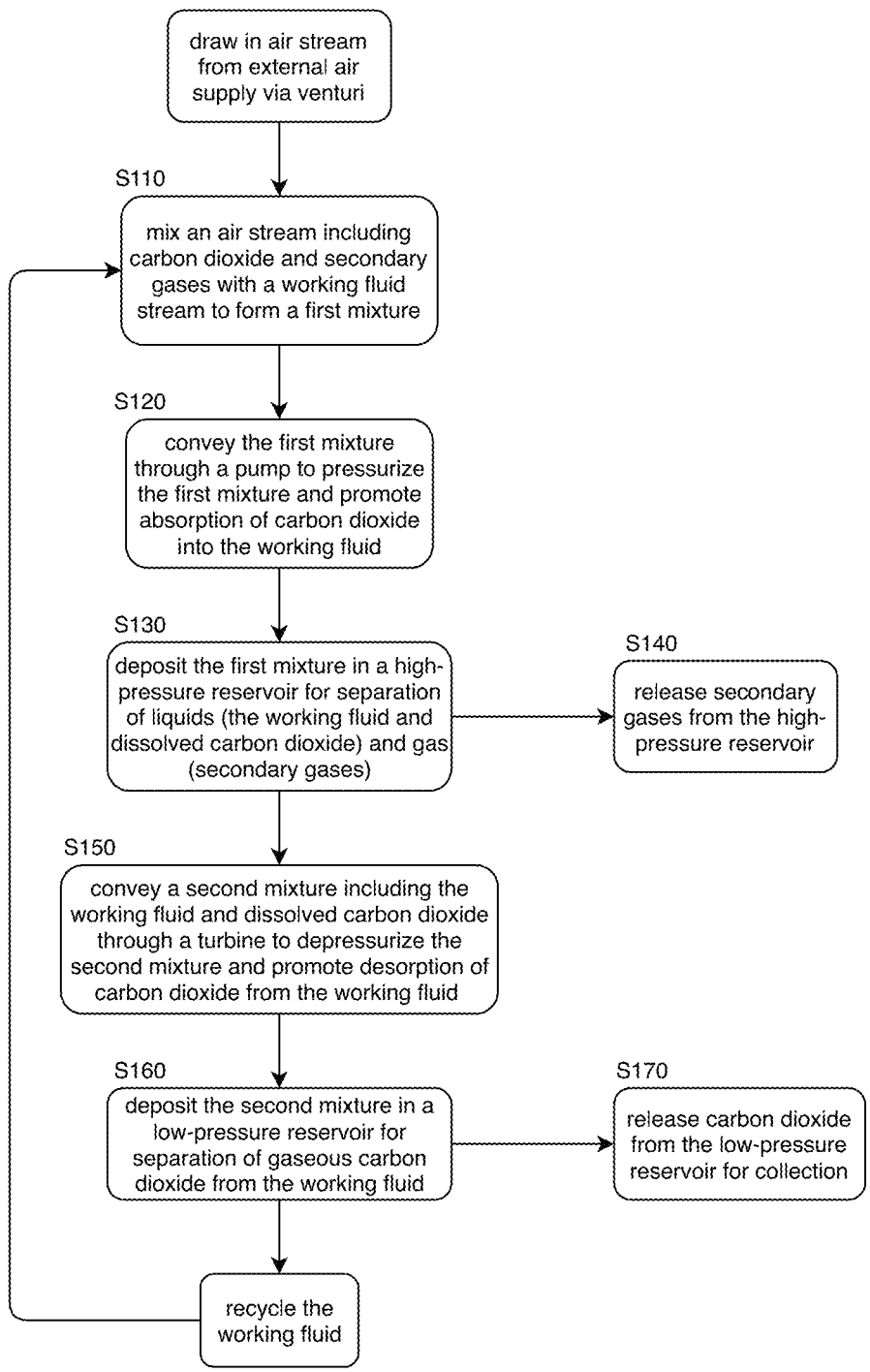
FIG. 3 is a flowchart representation of a method.
Figure 4:
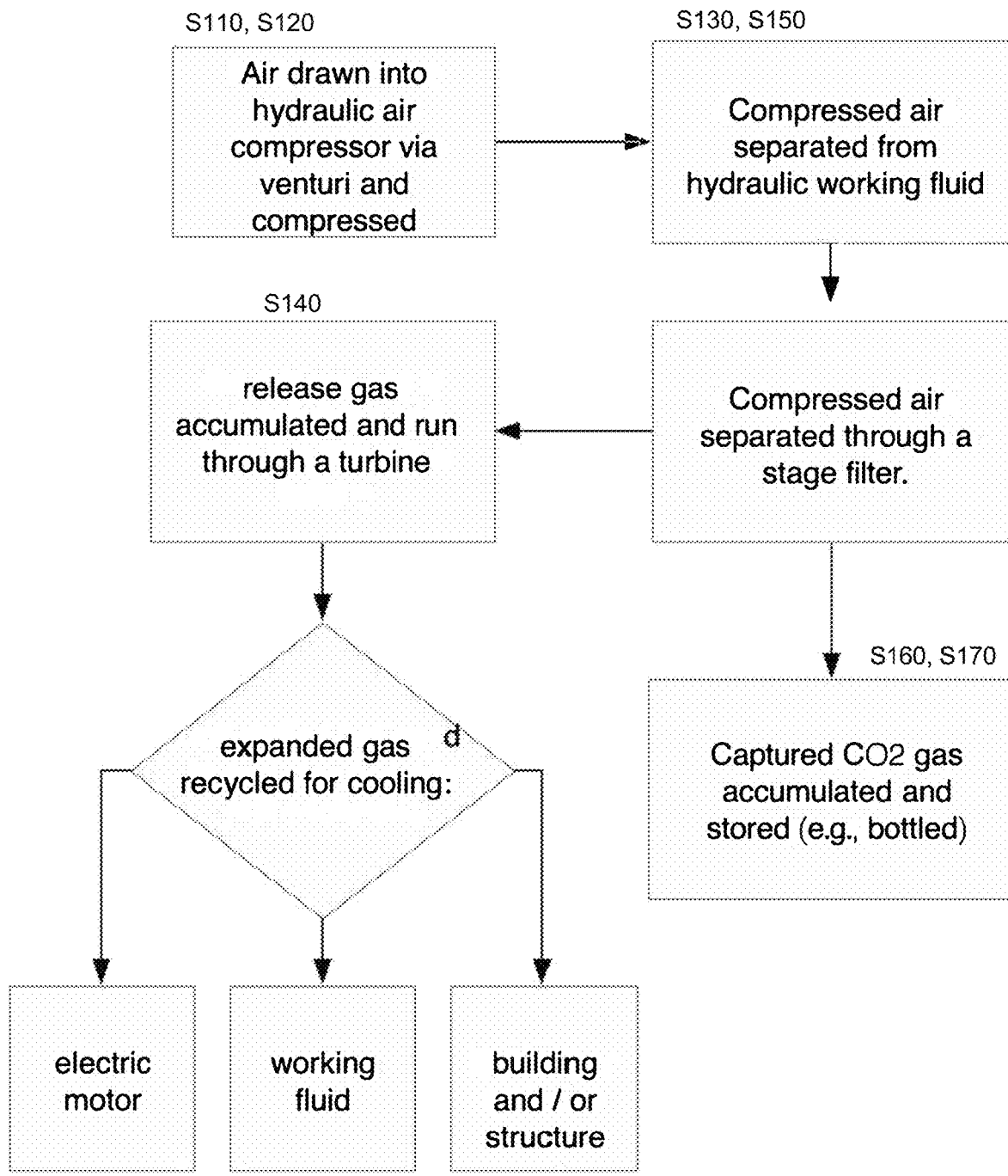
FIG. 4 is a flowchart representation of a method.

As shown in FIGS. 3 and 4, a method S100 for carbon sequestration includes: mixing ambient air including carbon dioxide and a set of secondary gases with a working fluid from a low-pressure vessel 130 to generate a first mixture including a volume of air dispersed throughout the working fluid in Block S110; conveying the first mixture through a compressor 120 configured to pressurize the first mixture from a first pressure within a first pressure range at an inlet of the compressor 120 to a second pressure within a second pressure range at an outlet of the compressor 120, the second pressure range greater than the first pressure range, to promote absorption of carbon dioxide present in the volume of air into the working fluid in Block S120; depositing the first mixture in a high-pressure vessel no to generate an exhaust stream including the set of secondary gases present in the volume of air and a second mixture including carbon dioxide dissolved in the working fluid in Block S130; and releasing the exhaust stream from the high-pressure vessel 110 via an exhaust outlet in Block S140.

The method S100 further includes: conveying the second mixture from the high-pressure vessel 110 through a turbine 140 configured to extract energy from the second mixture and reduce the pressure of the second mixture, from the second pressure at an inlet of the turbine 140 to the first pressure within the first pressure range at an outlet of the turbine 140, to promote desorption of carbon dioxide from the working fluid in Block S150; transferring the second mixture from the turbine 140 into the low-pressure vessel 130 in Block S160; and releasing carbon dioxide, desorbed from the working fluid, from the low-pressure vessel 130 for collection in Block S170.

2. System

Figure 1:
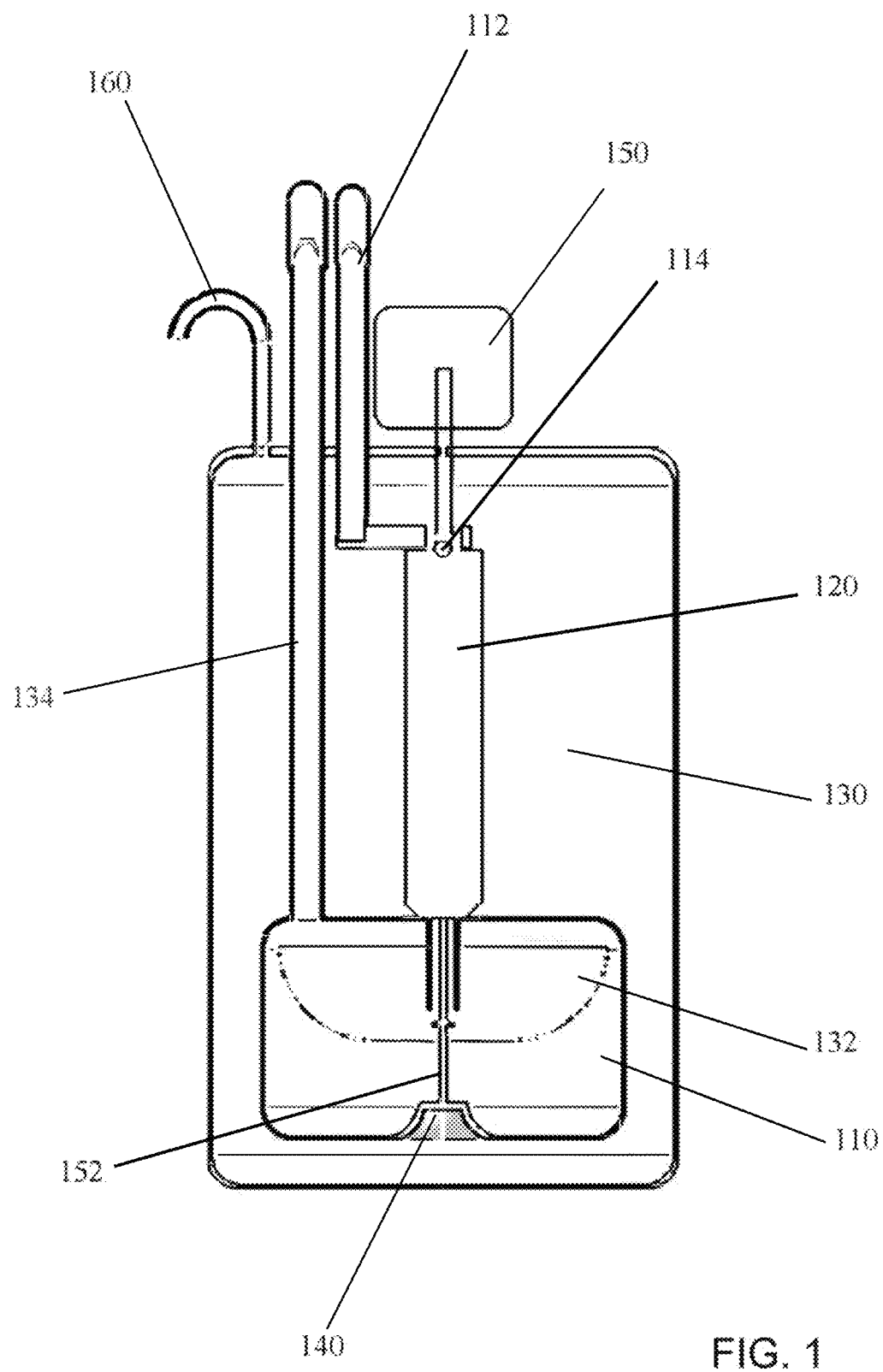
FIG. 1 is a schematic representation of a system.
Figure 2:
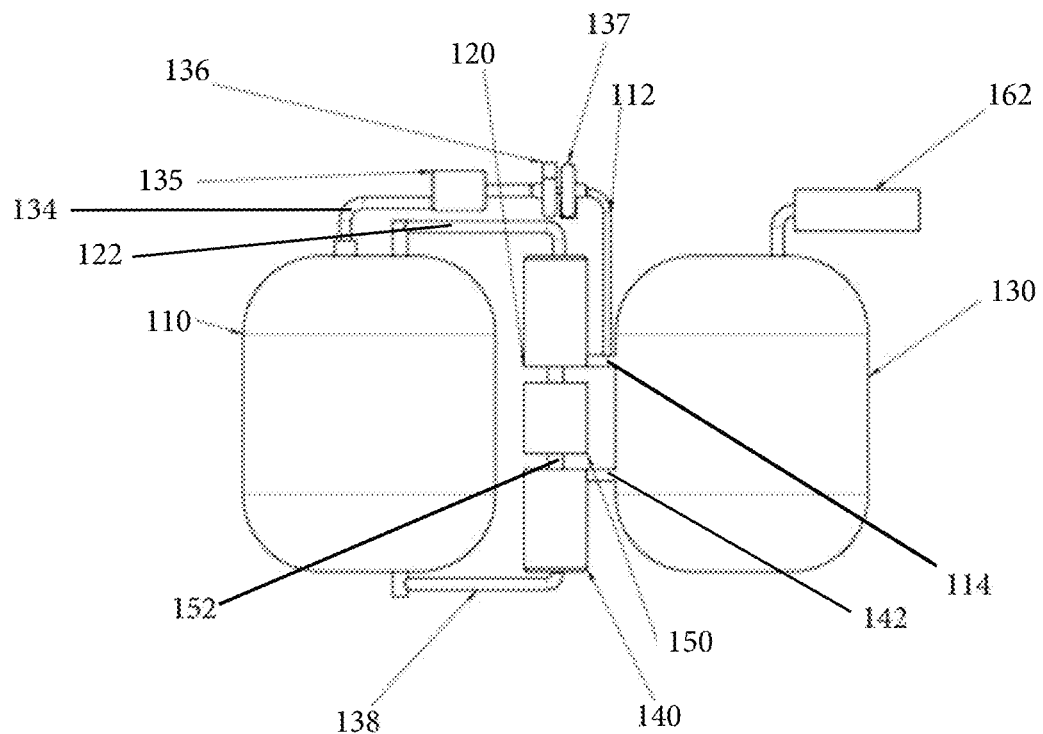
FIG. 2 is a schematic representation of the system.

As shown in FIGS. 1 and 2, a system 100 includes: a venturi 112; a compressor 120; a motor 150; a high-pressure vessel 110; an exhaust outlet 134; a turbine inlet 138; a turbine 140; a low-pressure vessel 130; and a collection outlet 160.

The venturi 112 is configured to mix ambient air with a working fluid—stored in the low-pressure vessel 130—to generate a first mixture including: a liquid phase including a volume of the working fluid; and a gaseous phase including a volume of air dispersed within the liquid phase, wherein the volume of air includes carbon dioxide and a set of secondary gases.

The compressor 120: is mechanically coupled to a driveshaft 152; and is configured to pressurize the first mixture from a first pressure in a first pressure range at an inlet of the compressor 120 to a second pressure within a second pressure range at an outlet of the compressor 120, wherein the second pressure range is greater than the first pressure range, to promote absorption of carbon dioxide present in the gaseous phase into the working fluid in the liquid phase.

The motor 150 is mechanically coupled to the driveshaft 152 and is configured to drive the compressor 120.

The high-pressure vessel 110 is configured to receive the first mixture, at the second pressure, from the compressor 120.

The exhaust outlet 134 is configured to collect an exhaust stream, including the set of secondary gases separated from the liquid phase of the first mixture, from the high-pressure vessel 110.

The turbine inlet 138 is configured to collect a second mixture—including the working fluid and a volume of carbon dioxide—from the high-pressure vessel 110.

The turbine 140 is mechanically coupled to the driveshaft 152 and is configured to: reduce the second mixture exiting the high-pressure vessel 110 from the second pressure at the turbine inlet 138 to the first pressure at an outlet of the turbine 140 by extracting energy from the second mixture; promote desorption of the volume of carbon dioxide from the volume of working fluid; and transfer energy extracted from the second mixture into a torque on the driveshaft 152 to rotate the compressor 120.

The low-pressure vessel 130 is configured to promote separation of the volume of carbon dioxide from the volume of working fluid of the second mixture.

The collection outlet 160 is configured to collect the volume of carbon dioxide from the low-pressure vessel 130.

3. Applications

Generally, as shown in FIGS. 1-4, the method S100 can be executed by a system 100: to directly capture an air stream including carbon dioxide and other secondary gases found in air (e.g., nitrogen, oxygen, argon) from an air source (e.g., outdoor air, recirculated air within a building); to entrain a working fluid stream with this air stream to generate a gas-liquid mixture; to process this gas-liquid mixture—according to various techniques and/or in combination with additional components—to rapidly increase concentration of carbon dioxide in the working fluid stream for removal of secondary gases from the gas-liquid mixture; and to rapidly separate carbon dioxide from the working fluid stream for collection. In particular, the method S100 includes: mixing an air stream including carbon dioxide and other secondary gases with a working fluid stream to form an aspirated fluid stream; compressing this aspirated fluid stream to rapidly increase concentration of carbon dioxide dissolved in the working fluid stream via pressurization of the stream; separating the secondary gases from the working fluid stream including the dissolved carbon dioxide in a high-pressure vessel 110; expanding the remaining working fluid stream and dissolved oxygen to rapidly decrease concentration of carbon dioxide dissolved in the working fluid stream via depressurization of the fluid stream; and separating the gaseous carbon dioxide from the working fluid stream in a low-pressure vessel 13*o*. This gaseous carbon dioxide can then be collected and stored while the working fluid can be recycled to continuously extract carbon dioxide from an inbound air stream. For example, the method S100 can be executed to extract carbon dioxide from atmospheric air and sequester this carbon dioxide via an energy-efficient (e.g., high energy recovery), scalable, deployable, and cost-effective process.

Traditional systems and/or processes for capturing carbon dioxide from atmospheric air operate with substantial energy losses, are not scalable, and are not cost-effective. Conversely, the system 100 consumes significantly less energy (e.g., 40 percent less energy) than traditional carbon capture systems by implementing methods and techniques for recapturing energy supplied to the system 100. For example, the system 100 can include: a singular driveshaft 152 coupled to a motor 150; a compressor 120 powered by the motor 150 and configured to compress fluids for absorption of carbon dioxide into a working fluid; and a turbine 140 configured to expand fluids for desorption of carbon dioxide from the working fluid. The motor 150 can be configured to supply power to the compressor 120. However, at the turbine 140, high-pressure, high-energy carbon dioxide is expanded to lower-pressure, lower-energy carbon dioxide. This energy gained by the system 100 from the expansion of carbon dioxide can be converted to mechanical energy. Because the turbine 140 and the compressor 120 are coupled to the same driveshaft 152, this mechanical energy generated by the turbine 140 can be leveraged to power the compressor 120, thus reducing energy required by the motor 150 to power the compressor 120. Further, by mechanically coupling the compressor 120, the turbine 140, and the motor 150 to a singular driveshaft 152 extending along a central axis of the low-pressure vessel 130, the system 100 is limited to a singular moving assembly, thereby: minimizing opportunities for breakage of different parts of the system 100; minimizing a number of parts required for assembly of the system 100; and increasing compactness and space efficiency of the system 100.

Furthermore, because the system 100 includes few moving parts and is scalable, the system 100 can be deployed to various locations to capture carbon dioxide from atmospheric air at these various locations. For example, the system 100 can be deployed as a modular unit and distributed about a large geographic region to sequester carbon dioxide from atmospheric air in this geographic region. In another example, the system 100 can be mounted to a building or structure. In each of the examples, the system 100 can be scaled to an appropriate size based on the location of deployment.

The system 100 is configured to capture carbon dioxide from atmospheric air by leveraging solubility of carbon dioxide in the working fluid (e.g., water) at different pressures. In particular, the system 100 is configured to: concentrate carbon dioxide in the working fluid and separate out secondary gases at high pressures in a high-pressure vessel 110; and separate carbon dioxide from the working fluid at low pressures in a low-pressure vessel 130 (e.g., after secondary gases have been removed). Therefore, by oscillating the working fluid between two vessels (e.g., a high-pressure vessel 110 and a low-pressure vessel 130), the system 100 can leverage changes in pressure to control a carbon dioxide carrying capacity of the working fluid and thus control absorption and desorption of carbon dioxide form the working fluid.

4. Nested High-Pressure & Low-Pressure Vessels

In one implementation, as shown in FIG. 1, the system 100 includes: a low-pressure vessel 130 configured to hold fluid at pressures within a first pressure range; and a high-pressure vessel 110—nested within the low-pressure vessel 130—configured to hold fluids at pressures within a second pressure range exceeding pressures within the first pressure range. Generally, in this implementation, the high-pressure vessel 110 and the low-pressure vessel 130 are coextensive. Further, the high-pressure vessel 110 and the low-pressure vessel 130 are structural and can therefore carry secondary components of the system 100. In this implementation, because the high-pressure and low-pressure vessels 110, 130 are nested and structural, the vessels, valves, driveshaft, and other elements of the system 100 can be arranged in a compact configuration with a single moving element, thereby: limiting features projecting outwardly from a body of the system 100 defined by the low-pressure vessel 130; limiting the overall diameter of the system 100 (e.g., to a diameter of the low-pressure vessel 130) per unit mass or volume flow rate of ambient air through the system 100 (and therefore mass rate of carbon dioxide captured by the system 100); increasing compactness and space efficiency of the system 100 per unit mass or volume flow rate; reducing weight of the system 100 by supporting structures on a shell (exhibiting high hoop strength) defined by the low-pressure vessel 130; and improving ease of storage, transport, and setups of the system 100.

In this implementation, the system 100 further includes: a motor 150 external the low-pressure vessel 130 and mechanically coupled to a driveshaft 152 extending through the low-pressure vessel 130 (e.g., along a central axis of the low-pressure vessel 130); a compressor 120 nested within the low-pressure vessel 130 and mechanically coupled to the driveshaft 152; and a turbine 140 nested within the low-pressure vessel 130, mechanically coupled to the driveshaft 152 below the compressor 120, and fluidly coupled to the compressor 120. By mechanically coupling the compressor 120, the turbine 140, and the motor 150 to a singular driveshaft 152 extending along a central axis of the low-pressure vessel 130, the system 100 is limited to a singular moving assembly thereby minimizing points of failure within the system 100 and minimizing opportunities for breakage of different parts of the system 100. Further, the system 100 can leverage energy recaptured by the turbine 140 via expansion of fluids to generate a torque on the driveshaft 152 and therefore rotate the compressor 120, thereby reducing energy required to be input by the motor 150 to rotate the compressor 120.

4.1 Working Fluid+Air (Entrainment)

Block S110 of the method S100 recites mixing ambient air including carbon dioxide and a set of secondary gases with a working fluid from a low-pressure vessel 130 to generate a first mixture including a volume of air dispersed throughout the working fluid. In particular, a volume of the working fluid can be entrained with a volume of ambient air, such that the resulting first mixture defines: a liquid phase including the volume of the working fluid; and a gaseous phase including the volume of air dispersed throughout the volume of the working fluid in the liquid phase.

In one implementation, air—including carbon dioxide and other secondary gases (e.g., nitrogen, argon)—is drawn in from an external source (e.g., a surrounding environment) via a venturi 112. The air travels through an air inlet (e.g., an enclosed air inlet) extending from a surrounding environment into the low-pressure vessel 130 and toward the venturi 112, such that the air does not mix with the working fluid present in the low-pressure vessel 130 while travelling through the enclosed inlet. Simultaneously, a working fluid is drawn into an opening from the low-pressure vessel 130 and through the venturi 112 where it is mixed with the air.

For example, a volume of air can be drawn, from an external source (e.g., atmospheric air), through an air inlet via a venturi 112 nested within the low-pressure vessel 130. Simultaneously, a volume of water (i.e., the working fluid) can be drawn through a compressor inlet 114 via a compressor 120, the compressor inlet 114 fluidly coupled to the venturi 112 and the compressor 120. The volume of air—including carbon dioxide and a set of secondary gases (e.g., nitrogen, argon, oxygen)—can then be mixed with the volume of water in the compressor inlet 120 prior to reaching the compressor 120. When mixed, the volume of air and the volume of water generate a first mixture (e.g., a gas-liquid mixture) including: a liquid phase including the volume of water; and a gaseous phase including a volume of air (e.g., of carbon dioxide and the set of secondary gases) distributed throughout the volume of water of the liquid phase.

The working fluid can be selected based on absorbency of carbon dioxide and other secondary gases present in atmospheric air in the working fluid. For example, the working fluid can be configured to absorb carbon dioxide at higher pressures and to release carbon dioxide at lower pressures. Further, the working fluid can be configured to prioritize absorption of carbon dioxide over other secondary gases at particular pressures and temperatures, such that the working fluid selectively absorbs carbon dioxide and limits absorption of (e.g., does not absorb) secondary gases present in air. In one implementation, the working fluid can be water. In another implementation, to enable further absorption of carbon dioxide from the volume of air into the working fluid, the working fluid can be treated with solvents configured to increase carbon dioxide absorption. For example, the working fluid can include an amine solvent (e.g., an ethanolamine) dissolved in water.

4.2 Pressurizing the First Mixture

Block S120 of the method S100 recites conveying the first mixture through a compressor 120 configured to pressurize the first mixture from a first pressure within a first pressure range at an inlet of the compressor 120 to a second pressure within a second pressure range at an outlet of the compressor 120, the second pressure range greater than the first pressure range, to promote absorption of carbon dioxide present in the volume of air into the working fluid. In particular, the compressor 120 can be configured to receive the first mixture at a first pressure and output the first mixture at a second pressure greater than the first pressure. As pressure of the first mixture increases along the compressor 120, a capacity of the working fluid for absorbing carbon dioxide increases, thus enabling an increase in concentration of carbon dioxide in the working fluid in the liquid phase.

Further, to prevent absorption of other secondary gases present in the first mixture into the working fluid, the system 100 can be configured to hold the first mixture at temperatures within a particular temperature range in which the working fluid selectively absorbs carbon dioxide over other secondary gases. For example, the system 100 can include water as the working fluid. At temperatures exceeding 35 degrees Celsius, water may absorb carbon dioxide at significantly higher rates (e.g., 90 percent to 100 percent higher) than other secondary gases present in air in the first mixture (e.g., Nitrogen, Argon). Therefore, in this example, the system 100 can be configured to maintain the first mixture at temperatures above 35 degrees Celsius and below a maximum temperature (e.g., 45 degrees Celsius) at which carbon dioxide is significantly less soluble in water.

In one implementation, the compressor 120 can be configured to isothermally compress air present in the first mixture, thereby increasing pump efficiency. For example, as gases (e.g., carbon dioxide, nitrogen, argon) present in air within the first mixture are compressed, temperatures of these gases increase. However, this generated heat can be transferred to the working fluid nearly instantaneously, such that the gases maintain approximately (e.g., within 2 degrees Celsius) constant temperatures. To prevent the working fluid from heating above a maximum temperature, the system 100 can include a heat exchanger coupled to the compressor 120 and configured to maintain temperatures of the working fluid within a particular temperature range (e.g., between 35 degrees Celsius and 40 degrees Celsius).

4.3 Separation of Non-$CO_2$ Gases

Block S130 of the method S100 recites depositing the first mixture in a high-pressure vessel 110 to generate an exhaust stream including the set of secondary gases present in the volume of air and a second mixture including carbon dioxide dissolved in the working fluid. In particular, the high-pressure vessel 110 can be fluidly coupled to the compressor 120 such that the compressor 120 transfers the first mixture into the high-pressure vessel 110 at elevated pressures due to compression of the first mixture by the compressor 120. The high-pressure vessel 110 can be configured to maintain these elevated pressures and/or to further increase pressure of the first mixture within the high-pressure vessel 110.

The high-pressure vessel 110 (e.g., a high-pressure chamber) can be nested within the low-pressure vessel 130 (e.g., a low-pressure chamber). For example, the high-pressure vessel 110 can define: a second diameter less than a first diameter of the low-pressure vessel 130; and a second height less than a first height of the low-pressure vessel 130. In this example, the low-pressure vessel 130 and the high-pressure vessel no can be concentric the driveshaft 152 of the motor 150, such that the first mixture travels vertically from the compressor 120 into the high-pressure vessel 110.

In one implementation, the system 100 includes a high-pressure vessel 110 (i.e., the high-pressure vessel no) defining an upper region and lower region. The upper region can include an exhaust outlet through which secondary gases separated from the working fluid can exit the high-pressure vessel 110. The lower region can include an outlet through which the working fluid and dissolved carbon dioxide (i.e., the second mixture) can exit the high-pressure vessel 110. Therefore, the high-pressure vessel 110 can be configured to: separate and accumulate the gaseous phase of the first mixture in the upper region of the high-pressure vessel 110; and separate and accumulate the liquid phase of the first mixture in the lower region of the high-pressure vessel 110. Once the secondary gases have been removed (e.g., below a particular concentration), the resulting exhaust stream can be released via the exhaust outlet and the resulting second mixture can exit the high-pressure reactor via the outlet.

In one implementation, the high-pressure vessel 110 includes a structure 152 (e.g., a "bowl-like" structure) configured to increase separation of the gaseous phase of the first mixture from the liquid phase by increasing a surface area of the first mixture within the high-pressure vessel 110. For example, the high-pressure vessel 110 can include a bowl 132 arranged within the upper region of the high-pressure vessel 110 and defining a concave surface curved upward toward the compressor 120. The first mixture can then flow downward from an outlet of the compressor 120 and into the high-pressure vessel 110, where it splashes onto the concave surface of the bowl 132. The first mixture can then splash out of the bowl 132 into the lower region of the high-pressure vessel 110 and/or spill over the edges of the concave surface of the bowl 132 down into the lower region. By enabling the first mixture to splash in and out of the bowl 132 and eventually fall downward into the lower region of the high-pressure vessel 110, the system 100 promotes separation of the secondary gases from the working fluid and dissolved carbon dioxide by increasing surface area of the first mixture and thus increase evaporation of the secondary gases across this surface area.

4.3.1 Exhaust Stream

Block S140 of the method S100 recites releasing the exhaust stream from the high-pressure vessel 110 via an exhaust outlet 134. As described above, the exhaust stream can separate from the second mixture within the high-pressure vessel 110 via gravity (e.g., due to differences in density). This exhaust stream can exit the high-pressure vessel 110 via the exhaust outlet 134 located within the upper region of the high-pressure vessel.

In one variation, the system 100 can include a turbocharger coupled to the exhaust outlet 134 of the high-pressure vessel 110 and to the venturi 112. The turbocharger can include a turbo-expander 136 mechanically coupled to a turbo-compressor 137 via a shared driveshaft (e.g., distinct from driveshaft 152). The turbo-compressor 137 can be fluidly coupled to the venturi 112. In this variation, hot compressed gases (e.g., secondary gases) exiting the high-pressure vessel 110 can be transferred via the exhaust outlet 134 to the turbo-expander 136. The turbo-expander 136 can extract energy from these high-energy, high-pressure secondary gases via expansion to generate a torque on the shared driveshaft to rotate the turbo-compressor 137. The turbo-compressor 137 can be configured to intake ambient air and compress this air, thereby increasing pressure of the air. The turbo-compressor 137 can then feed this compressed air to the venturi 112. Therefore, by including this turbocharger, a portion of the air stream entering the venturi 112 is already pressurized above ambient pressure, thus enabling further and faster absorption of carbon dioxide into the working fluid and minimizing energy required by the compressor 120 to compress air in the first mixture.

4.4 Depressurizing the Second Mixture

Block S150 of the method S100 recites conveying the second mixture from the high-pressure vessel 110 through a turbine 140 configured to extract energy from the second mixture and reduce the pressure of the second mixture, from the second pressure at an inlet of the turbine 140 to the first pressure within the first pressure range at an outlet of the turbine 140, to promote desorption of carbon dioxide from the working fluid. In particular, the system 100 can include the turbine 140 (e.g., a Francis turbine 140) configured to receive the second mixture at a first pressure and output the second mixture at a second pressure less than the first pressure. As pressure of the second mixture decreases along the turbine 140, the capacity of the working fluid for absorbing carbon dioxide decreases, thus enabling separation of carbon dioxide from the working fluid in the liquid phase.

The turbine 140—mechanically coupled to the compressor 120 via the driveshaft 152—can be configured to recover and recycle energy lost in the compressor 120. For example, as pressure builds up in the high-pressure vessel 110 over time, the turbine 140—thermally coupled to the high-pressure vessel 110—heats up and eventually reaches a steady state. Once the turbine 140 reaches this steady state, any excess energy harnessed from running the second mixture through the turbine 140 can be leveraged to power the compressor 120. Therefore, the energy input by the motor 150 in order to power the compressor 120 will decrease over time as the turbine 140 approaches steady state, thus decreasing power required to maintain operation of the system 100 and decreasing operating costs.

The turbine 140 can be mechanically coupled to the compressor 120 and the motor 150 via the driveshaft 152. Further, the turbine 140 can be nested within both the low-pressure vessel 130 and the high-pressure vessel 110, such that an outer face of the turbine 140—including the outlet of the turbine 140—is approximately flush with a bottom surface of the high-pressure vessel 110. Therefore, high-pressure high-energy fluid (i.e., the second mixture) exiting the high-pressure vessel no is automatically drawn into the turbine 140 via gravity. At an outlet of the turbine 140, the resulting low-pressure low-energy fluid is automatically released into the low-pressure vessel 130.

4.5 $CO_2$ Capture

Block S160 of the method S100 recites transferring the second mixture from the turbine 140 into the low-pressure vessel 130. In particular, once the second mixture exits the turbine 140, the second mixture can be released into the low-pressure vessel 130 at reduced pressures. The low-pressure vessel 130—encompassing the high-pressure vessel 110, the compressor 120, and the turbine 140—can be configured to maintain these reduced pressures and/or to further reduce pressure of the second mixture within the low-pressure vessel 130. At these reduced pressures, the carbon dioxide separates from the working fluid in the liquid phase to generate carbon dioxide gas distinct from the working fluid.

To increase an extent and/or rate of separation of the carbon dioxide gas from the working fluid, the low-pressure vessel 130 can implement methods and/or techniques for cooling the working fluid within the low-pressure vessel 130. For example, the system 100 can include a set of copper coils (i.e., a cooling jacket) surrounding the low-pressure vessel 130. Further, in this example, the low-pressure vessel 130 can include a first temperature sensor arranged near a top of the low-pressure vessel 130 and a second temperature sensor arranged near a bottom of the low-pressure vessel 130. The system 100 can therefore monitor a temperature gradient across the low-pressure vessel 130 and cool the low-pressure vessel 130 via pumping refrigerant (e.g., cool water, ethylene glycol) through the set of copper coils to maintain a particular temperature gradient within the low-pressure vessel 130. By maintaining the low-pressure vessel 130 within a particular temperature range or maintaining a particular temperature gradient across the low-pressure vessel 130, the system 100 enables the working fluid—including dissolved carbon dioxide—to cool to sufficiently low temperatures (e.g., between 30 and 35 degrees Celsius) quickly, such that the carbon dioxide dissolved in the working fluid separates from the working fluid and exits the low-pressure vessel 130 via the collection outlet 160 before the working fluid exits the low-pressure vessel 130 and is recycled back to the compressor 120.

Block S170 of the method S100 recites releasing carbon dioxide, desorbed from the working fluid, from the low-pressure vessel 130 for collection. The low-pressure vessel 130 can include a collection outlet 160 through which gaseous carbon dioxide, separated from the working fluid—can exit the low-pressure vessel 130. This carbon dioxide released from the collection outlet 160 can be collected (e.g., bottled) and stored. Once the carbon dioxide is removed from the low-pressure vessel 130, the clean working fluid can be recycled back through the system 100 for continuous removal of carbon dioxide from atmospheric air.

5. Separated Low-Pressure and High-Pressure Vessels

In another implementation, as shown in FIG. 2, the low-pressure vessel 130 and the high-pressure vessel 110 are not nested. In this variation, the low-pressure vessel 130 is fluidly coupled to the high-pressure vessel 110, and the low-pressure vessel 130, the compressor 120, the high-pressure vessel 110, and the turbine 140 form a loop, each fluidly coupled to one another. In this implementation, the system 100 can include a singular driveshaft 152 coupled to the compressor 120, the motor 150, and the turbine 140. In this implementation, the driveshaft 152 is located external the low-pressure vessel 130.

For example, in this implementation, the system 100 can include: a compressor 120 mechanically coupled to a driveshaft 152 (e.g., extending vertically below the compressor 120) and configured to pressurize the liquid phase during transfer from the low-pressure vessel 130 into the high-pressure vessel 110; a turbine 140 mechanically coupled to the driveshaft 152 (e.g., below the motor iso) and configured to extract energy from the second mixture and to transform this energy into rotation of the compressor 120 in cooperation with the motor 150 (e.g., to reduce power consumption of the motor 150 per unit of carbon dioxide captured by the system 110); a motor 150 coupled to the compressor 120 and the turbine 140 via the driveshaft 152; a low-pressure vessel 130 fluidly coupled to a compressor inlet 114 of the compressor 120 and to a turbine outlet 142 of the turbine 140; and a high-pressure vessel 110 fluidly coupled to a compressor outlet 122 of the compressor 120 and to a turbine inlet 138 of the turbine 140. In this example, the system 100 further includes: a venturi 112 configured to entrain ambient air into a working fluid flowing from the low-pressure vessel 130 toward the compressor 120; an exhaust outlet coupled to the high-pressure vessel 110 and configured to release secondary gases (e.g., oxygen, nitrogen)—not absorbed into the working fluid at higher pressures in the second pressure range—from the high-pressure vessel 110; and a collection outlet 160 coupled to the low-pressure vessel 130 and configured to release carbon dioxide—desorbed from the working fluid at lower pressures in the first pressure range—from the low-pressure vessel 120, such as by transfer into a holding tank or other storage.

5.1 Carbon Dioxide Capture

In this implementation, in which the high-pressure vessel 110 and the low-pressure vessel 130 are not coextensive, air—including carbon dioxide and the set of secondary gases—can be drawn through the venturi 112 and fed to the compressor inlet 114. Simultaneously, the working fluid can be drawn from the low-pressure vessel 130 and into the compressor inlet 114 by the compressor 120, where the working fluid is mixed with air to form the first mixture. The first mixture—including a volume of working fluid and a volume of air dispersed within the volume of working fluid—can then be fed to the compressor 120.

At the compressor 120, the first mixture is compressed from pressures within a first pressure range to pressures within a second pressure range, pressures within the second pressure range exceeding pressures within the first pressure range. As pressure increases in the first mixture, the working fluid's capacity for carbon dioxide absorption increases and the concentration of dissolved carbon dioxide in the working fluid increases. Thus, after compression by the compressor 120, the first mixture includes a gaseous phase including the set of secondary gases and a liquid phase including the working fluid and dissolved carbon dioxide (or "carbonated working fluid").

The first mixture can then be routed to the high-pressure vessel 110 via the compressor outlet 122. The high-pressure vessel 110 can be configured to hold fluids present in the high-pressure vessel 110 at pressures within the second pressure range, such that carbon dioxide remains dissolved in the working fluid in the liquid phase. Due to differences in densities of the liquid phase and the gaseous phase, the gaseous phase separates to an upper region of the high-pressure vessel 110, while the liquid phase separates to a lower region of the high-pressure vessel 110. Alternatively, in one variation, the high-pressure vessel 110 can be configured to enable separation of the gaseous phase and the liquid phase via vortex separation.

The secondary gases of the gaseous phase can then exit the high-pressure vessel 110 through an exhaust outlet 134 coupled to the upper region of the high-pressure vessel 110. These heated secondary gases can then be released and/or collected and recycled to power the compressor 120, the turbine 140, and/or a turbocharger as described below.

The carbonated working fluid—including dissolved carbon dioxide in the working fluid—can exit the high-pressure vessel 110 through a turbine inlet 138 coupled to the lower region of the high-pressure vessel 110. This carbonated working fluid can then be fed to the turbine 140 coupled to the turbine inlet 138. At the turbine 140, the carbonated working fluid is expanded from pressures within the second pressure range to pressures within a third pressure range (e.g., approximating the first pressure range), pressures within the third pressure range less than pressures within the second pressure range. As pressure decreases in the carbonated working fluid, the working fluid's capacity for carbon dioxide absorption decreases and the concentration of dissolved carbon dioxide in the working fluid decreases, thereby forming a gaseous phase of carbon dioxide distinct from the liquid phase of the working fluid.

The carbonated working fluid—including the gaseous phase of carbon dioxide and the liquid phase of the working fluid—can then be routed to the low-pressure vessel 130 via the turbine outlet 142. The low-pressure vessel 130 can be configured to hold fluids present in the low-pressure vessel 130 at pressures within the third pressure range to promote further desorption of the carbon dioxide from the working fluid in the liquid phase. Due to differences in densities of the working fluid and the gaseous carbon dioxide, the carbon dioxide separates to an upper region of the low-pressure vessel 130, while the working fluid remains in a lower region of the low-pressure vessel 130. Alternatively, in one variation, the low-pressure vessel 130 can be configured to enable separation of the working fluid and the gaseous carbon dioxide via vortex separation.

The carbon dioxide can then exit the low-pressure vessel 130 through a collection outlet 160 where it can be routed to a carbon dioxide accumulator 162 for storage. The working fluid remaining in the low-pressure vessel 130 can then be drawn back through the compressor inlet 114 for continuous carbon dioxide capture.

5.2 Turbocharger

In one variation, the system 100 can include a turbo-expander 136 coupled to the exhaust outlet 134 of the high-pressure vessel 110. The turbo-expander 136 can be mechanically coupled to a turbo-compressor 137 via a shared driveshaft (e.g., distinct from driveshaft 152), thus forming a turbocharger. The turbo-compressor 137 can be fluidly coupled to an inlet of the venturi 112. In this variation, hot compressed gases (e.g., secondary gases) exiting the high-pressure vessel 110 can be transferred via the exhaust outlet 134 to the turbo-expander 136. The turbo-expander 136 can expand these hot compressed gases thereby reducing pressure of the gases. Simultaneously, rotation of the turbo-expander 136—driven by the exhaust stream of the high-pressure vessel 110—drives rotation of the turbo-compressor 137 mechanically coupled to the shared driveshaft. The turbo-compressor 137 can be configured to intake atmospheric air and compress this air, thereby increasing pressure of the air. The turbo-compressor 137 can then feed this compressed air to the inlet of the venturi 112. Therefore, by implementing this combination of the turbo-expander 136 and the turbo-compressor 137, a portion of the air stream entering the venturi 112 is already pressurized above ambient pressure, thus enabling further and faster absorption of carbon dioxide into the working fluid and minimizing energy required by the compressor 120 to compress air in the first mixture.

6. Variation: Vertical Narrow Compressor

Figure 5:
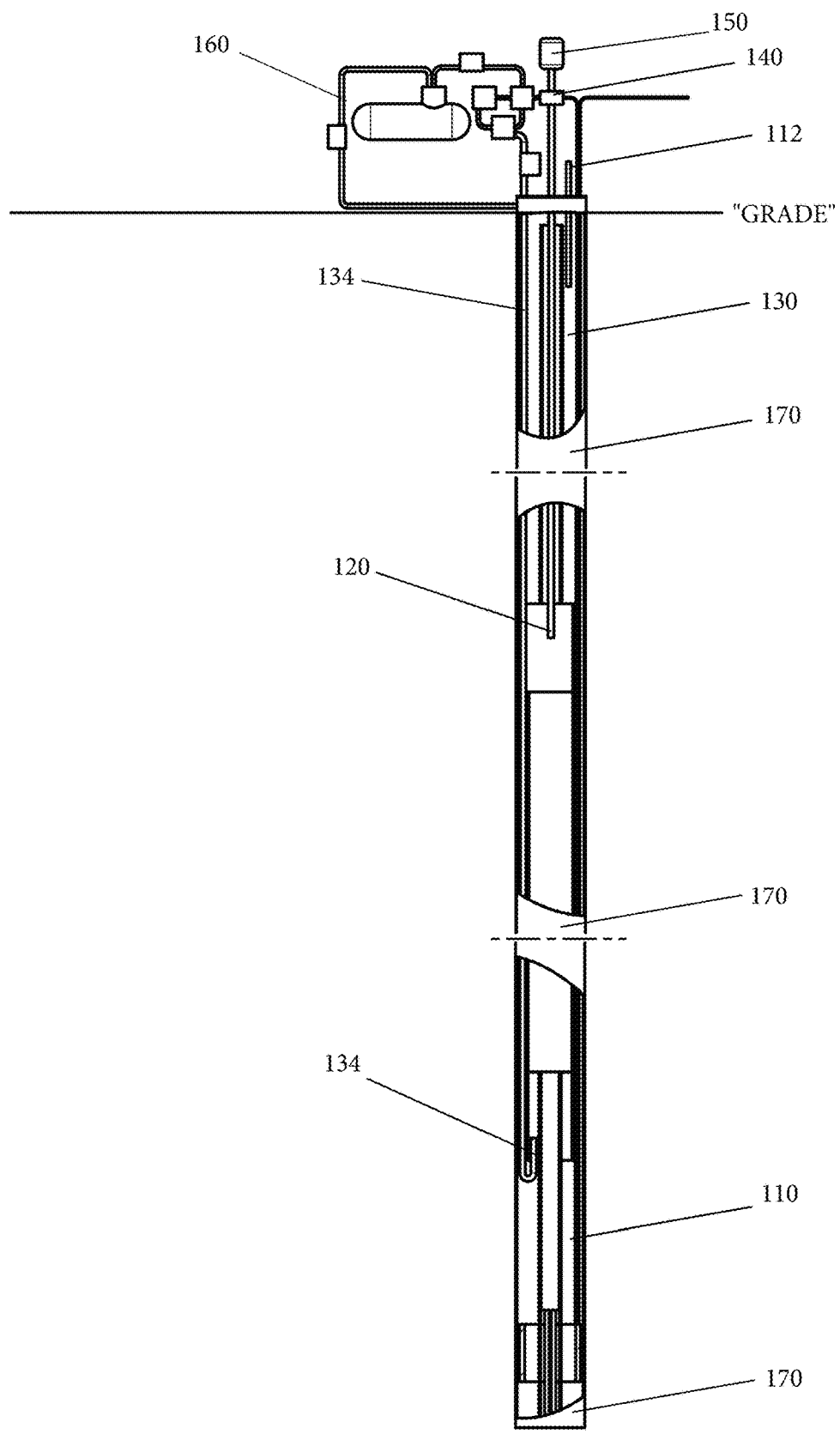
FIG. 5 is a schematic representation of the system.

In one variation, as shown in FIG. 5, the system 100 can be configured to transfer heat from the atmosphere into the ground. In this variation, the system 100 can include a housing tube 170 configured to pump the working fluid vertically below a surface of the ground to enable geothermal heat exchange between the working fluid and the ground which exhibits a higher heat capacity than the working fluid and air. Further, the housing tube 170 can extend to a particular depth (e.g., less than 400 feet) below the surface such that the working fluid and entrained air—forming the first mixture—can be compressed via gravity while flowing vertically downward through the housing tube 170.

The housing tube 170 can be configured to maximize heat transfer between the working fluid and the ground. For example, the housing tube 170 can be configured to: extend below the surface of the ground to a particular depth in order to maximize a surface area over which heat can transfer between the working fluid and the ground; and include walls of a maximum thickness in order to minimize a distance that heat must travel from the working fluid, through the housing tube 170, and to the ground.

For example, the working fluid can be mixed with air—including carbon dioxide and the set of secondary gases—to form the first mixture. The first mixture can then flow—via gravity—down the housing tube 170 from a surface of the ground toward a particular depth (e.g., 300 feet) below the surface. As the first mixture flows down the housing tube 170, the pressure of the first mixture increases at greater depths below the surface, thus enabling absorption of carbon dioxide into the working fluid. Further, the first mixture can flow past a heat exchanger configured to extract heat from the working fluid, thereby cooling the working fluid and enabling (near) isothermal compression of the first mixture. Heat extracted by this heat exchanger can be released into the ground for geothermal heat exchange, thereby enabling heat transfer from the atmosphere into the ground.

At a bottom (i.e., the high-pressure vessel 110) of the housing tube 170, the high-pressure high-energy secondary gases can separate from the working fluid and dissolved carbon dioxide. These secondary gases can be released from this high-pressure vessel no via the exhaust outlet 134 travelling upward through the housing tube 170. The remaining second mixture—including the working fluid and dissolved carbon dioxide—can be pumped upward via a fluid return tube within the housing tube 170. As the second mixture is pumped upward through the fluid return tube 172, the pressure of the high-pressure high-energy second mixture decreases at depths closer to the surface of the ground, thus enabling desorption of carbon dioxide from the working fluid. Therefore, at or near the surface of the ground, carbon dioxide can be separated from the working fluid and collected via the collection outlet 160.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
mixing ambient air including carbon dioxide and a set of secondary gases with a working fluid from a low-pressure vessel to generate a first mixture including a volume of air dispersed throughout the working fluid;
conveying the first mixture through a compressor configured to pressurize the first mixture from a first pressure within a first pressure range at an inlet of the compressor to a second pressure within a second pressure range at an outlet of the compressor, the second pressure range greater than the first pressure range, to promote absorption of carbon dioxide present in the volume of air into the working fluid;
depositing the first mixture in a high-pressure vessel to generate:
an exhaust stream including the set of secondary gases; and
a second mixture including carbon dioxide dissolved in the working fluid;
releasing the exhaust stream from the high-pressure vessel via an exhaust outlet;

conveying the second mixture from the high-pressure vessel through a turbine configured to extract energy from the second mixture and reduce pressure of the second mixture, from the second pressure at an inlet of the turbine to the first pressure within the first pressure range at an outlet of the turbine, to promote desorption of carbon dioxide from the working fluid;

transferring the second mixture from the turbine into the low-pressure vessel; and releasing carbon dioxide, desorbed from the working fluid, from the low-pressure vessel for collection.

\* \* \* \* \*